C. REISS & F. B. LOUFEK.
HARROW ATTACHMENT FOR PLANTERS.
APPLICATION FILED JULY 26, 1910.
981,796.
Patented Jan. 17, 1911.
2 SHEETS—SHEET 2.
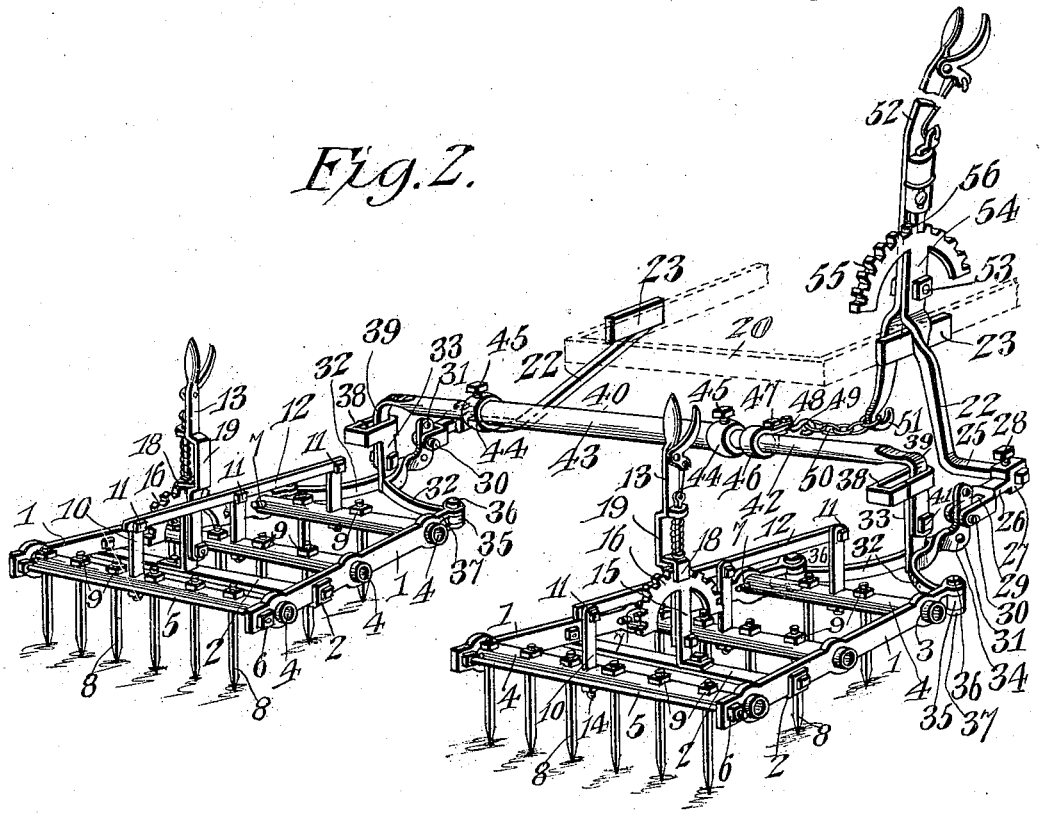
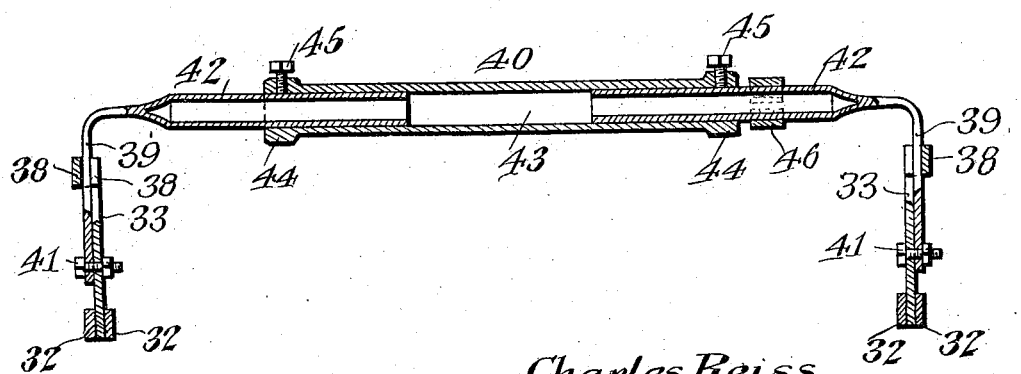

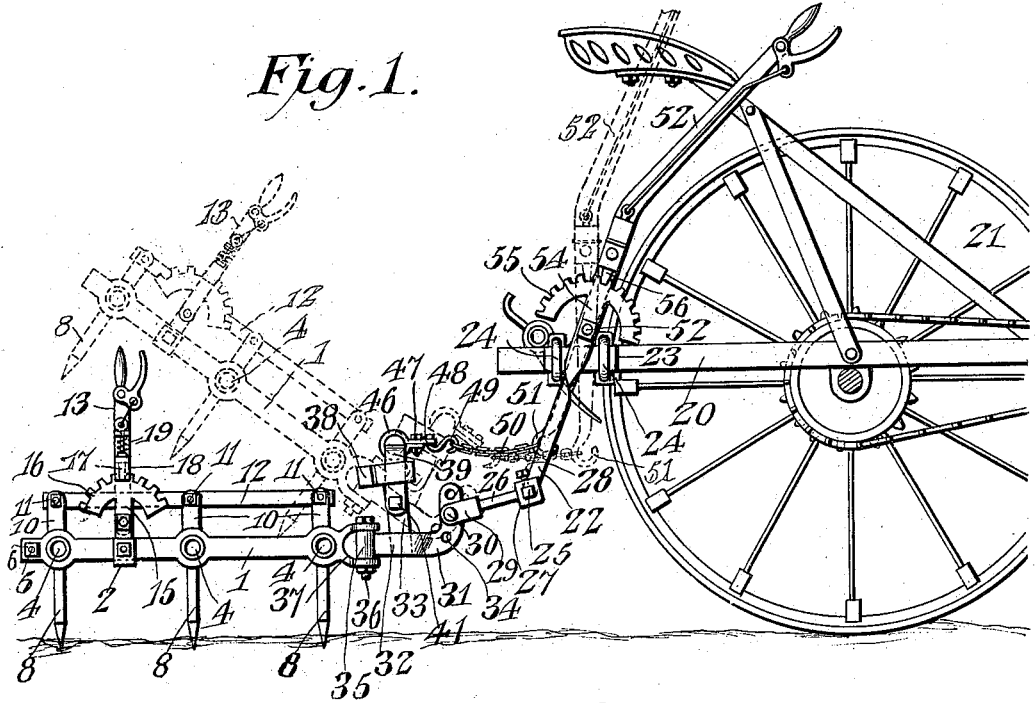

UNITED STATES PATENT OFFICE.

CHARLES REISS AND FRANK B. LOUFEK, OF MOUNT AUBURN, IOWA.

HARROW ATTACHMENT FOR PLANTERS.

981,796.  Specification of Letters Patent.  Patented Jan. 17, 1911.

Application filed July 26, 1910. Serial No. 573,989.

*To all whom it may concern:*

Be it known that we, CHARLES REISS and FRANK B. LOUFEK, citizens of the United States, residing at Mount Auburn, in the county of Benton and State of Iowa, have invented a new and useful Harrow Attachment for Planters, of which the following is a specification.

The invention relates to improvements in harrow attachments for planters.

The object of the present invention is to improve the construction of harrow attachments for planters, and to provide a simple, efficient and comparatively inexpensive attachment, equipped with a plurality of harrow sections and adjustable to enable it to be attached to any corn or other planter, and also to vary the distance between the harrow sections to suit the width of the rows.

With these and other objects in view, the invention consists in the construction and novel combination of parts hereinafter fully described, illustrated in the accompanying drawings, and pointed out in the claims hereto appended; it being understood that various changes in the form, proportion, size and minor details of construction, within the scope of the claims, may be resorted to without departing from the spirit or sacrificing any of the advantages of the invention.

In the drawings:—Figure 1 is a side elevation of the harrow attachment, constructed in accordance with this invention and shown applied to a planter. Fig. 2 is a perspective view of the harrow attachment, a portion of the planter frame being indicated in dotted lines. Fig. 3 is a plan view, partly in section, illustrating the manner of connecting the harrow sections with the planter frame. Fig. 4 is a transverse sectional view of the adjustable arched member for connecting the harrow sections. Fig. 5 is an enlarged detail sectional view, taken substantially on the line 5—5 of Fig. 3. Fig. 6 is a detail sectional view on the line 6—6 of Fig. 3.

Like numerals of reference designate corresponding parts in all the figures of the drawings.

In the embodiment of the invention illustrated in the accompanying drawings, the harrow attachment is equipped with two harrow sections, spaced apart to suit the width of the rows, and each composed of forwardly converging side bars 1, connected at an intermediate point by a transverse bar 2 and provided at intervals with alined bearing openings 3 for the reception of tubular tooth carrying bars 4.

The transverse bar 2 has its terminals bent upwardly and bolted, or otherwise secured to the outer faces of the side bars 1, which are also connected at their rear terminals by a transverse rod 5, piercing the side bars and secured to the same by nuts 6, mounted on threaded portions of the rod and engaging the inner and outer faces of the side bars 1.

The tooth carrying bars 4 are shown in the bearing openings 3 and are held against longitudinal movement by pins or keys 7, and they are provided at intervals with perforations for the reception of harrow teeth 8, which are adjustable by means of perforations to different portions of the tooth carrying bars to arrange the teeth to suit the character of the ground under cultivation. The harrow teeth are of the usual construction and are provided with threaded shanks, extending through the tooth carrying bars and secured to the same by nuts 9. The tubular tooth carrying bars are capable of rotary adjustment in the bearing openings to arrange the harrow teeth either in a vertical position or at an inclination, and they are provided with upwardly extending arms 10, pivotally connected by bolts 11 to a longitudinal rod 12, which is also connected at an intermediate point to an adjusting lever 13. The arms 10 have reduced lower threaded ends 14, which pierce the tooth carrying bars and are secured to the same by nuts. The lever 13 is pivoted to a bracket 15, provided with a toothed segment 16 and engaged by a spring actuated pawl or detent 17 of the adjusting lever, whereby the harrow teeth are locked in their adjustment. The adjusting lever 13 of each harrow section is angularly bent at an intermediate point, and an angle plate 18 is secured to the lower shoulder formed by the bend 19, and the said plate 18 extends beyond the bend 19 and provides a depending lip, which is arranged at the side of the segment opposite that on which the lever is pivoted. The spring actuated dog or detent is controlled by a latch lever pivotally mounted on the adjusting lever 13 adjacent to the handle portion thereof.

The harrow attachment is applied to the frame 20 of a planter 21 by means of opposite supporting bars or members 22, provided at their inner portions with attaching plates or flanges 23, which are secured by clips 24 to the sides of the planter frame. Bolts or any other suitable means may be employed for attaching the supporting bars to the planter frame, but the clips enable the attachment to be applied to the frame at any desired point. The supporting bars or members 22 incline downwardly and outwardly from the sides of the planter frame and are provided with horizontally projecting supporting arms 25 upon which are mounted adjustable hangers 26, preferably consisting of castings and extending rearwardly from the said laterally projecting supporting arms 25. The hangers 26 are provided at their front ends with sleeves 27, arranged on the supporting arms and adjustably secured to the same by set screws 28. The rear portions of the hangers are provided with slots or bifurcations 29, in which are adjustably pivoted by bolts 30 front approximately L-shaped arms 31 of the coupling frames or members. The coupling frames or members, which are designed in practice to consist of a single casting, comprises the said forwardly extending arms 31, a pair of rearwardly diverging arms 32, and an upwardly extending arm 33, all rigid with one another. The forwardly extending arm 31 has an upturned front portion provided with a plurality of perforations 34 for the reception of the bolt 30, whereby the coupling frame or member is adjustably connected to the hanger 26. The rearwardly diverging arms 32 are provided at their rear terminals with vertical eyes 35, having openings for the reception of bolts 36, or other suitable fastening means for securing the rear ends of the arms 32 in forked front ends 37 of the side bars 1 of the harrow sections.

The upright arm 33 is arranged at a slight inclination, being extended upwardly and rearwardly, and it is equipped at its upper end with an approximately oblong loop 38 for the reception of a downwardly extending portion 39 of an arched connecting member 40. The depending side portions 39 of the arched connecting member 40 are pivoted by bolts 41 to the arms 33 at points intermediate of the ends thereof and the loops 38, which receive the side portions 39, permit an independent pivotal action of the harrow sections to enable them to drop into low places and to permit them to spring upward should they strike a stone or other obstruction.

The arched member 40 is disposed transversely of the attachment and is composed of end sections 42 and a central section 43. The end sections 42 telescope into the central section 43, which is provided at its terminals with annular enlargements or rims 44, having threaded apertures for the reception of set screws 45, which secure the end sections in their adjustment. The end sections are provided with depending side portions 39, and the right hand end section is equipped with a collar 46, secured to such end section 42 by bolts 47 and provided with a projecting portion 48, having a perforation in which is linked a hook 49 of a short chain 50. The chain extends forwardly from the arched member and its front end is engaged with a hook 51 of an operating lever 52, pivoted at an intermediate point by a bolt 53 to an extension 54 of the right hand supporting bar or member 22. The extension 54 is provided at the top with a toothed segment 55, which is engaged by a spring actuated pawl or detent 56, carried by the operating lever and controlled by a rotary lever mounted thereon. The operating lever is designed to be located in a convenient position with relation to the seat of the planter, and is adapted to be operated to raise both of the harrow sections, as illustrated in dotted lines in Fig. 1 of the drawings. The harrow sections may be elevated to any desired extent and are secured in their adjustment by the ratchet mechanism of the operating lever.

The transversely disposed arched member with its adjustable sections and the adjustable hangers enable the harrow sections to be spaced the proper distance apart to suit the width of the rows, so that the soil may be harrowed at the proper points simultaneously with the planting of the seed, thereby obviating the necessity of harrowing the land after planting, and preventing field mice, birds and other animals from destroying the seed, and also rendering it impossible for the water from heavy rains to follow the deep planter marks on rolling ground and wash out the seed. Also it is unnecessary to harrow the land before plowing as the harrow sections destroy all the fine weeds and grass for ten inches on each side of the hill. By employing the harrow attachment in connection with the planter, the corn can be planted one inch shallower than is usually required and all the seed will be thoroughly covered.

Having thus fully described our invention, what we claim as new and desire to secure by Letters Patent, is:—

1. A harrow attachment of the class described including spaced supports extending from opposite sides of the frame of a machine and provided at their inner ends with attaching portions fitted against the sides of the frame, means for adjustably securing the attaching portions to the frame of the machine, hangers adjustable inwardly and outwardly on the supports, harrow sections pivotally connected with the hangers, and means for raising and lowering the harrow sections.

2. A harrow attachment of the class described including spaced supports provided with means for securing them to the opposite sides of a machine, one of the supports being provided with an extension having a toothed segment, harrow sections connected with the supports, and an operating lever pivotally mounted on the said extension and connected with the harrow sections for raising and lowering the sections and provided with means for engaging the toothed segment for securing the harrow sections in an elevated position.

3. A harrow attachment of the class described including spaced supports provided with means for securing them to the opposite sides of a machine and having laterally projecting supporting arms, hangers adjustable inwardly and outwardly on the supporting arms, and spaced harrow sections pivotally connected with the hangers.

4. A harrow attachment of the class described including spaced supports provided with means for securing them to the opposite sides of a machine and having laterally projecting supporting arms, hangers adjustably mounted on the supporting arms, spaced harrow sections pivotally connected with the hangers, and operating mechanism mounted on one of the supports and connected with the harrow sections for raising and lowering the same.

5. A harrow attachment of the class described including spaced supports provided with means for securing them to the opposite sides of a machine and having laterally disposed supporting arms, hangers provided with sleeves adjustably secured to the supporting arms, said hangers extending rearwardly therefrom and provided with bifurcated rear ends, harrow sections pivoted in the bifurcations of the hangers, and means for raising and lowering the harrow sections.

6. A harrow attachment of the class described including spaced supports provided with means for attaching them to the opposite sides of a machine, harrow sections pivotally connected with the supports, and operating mechanism for raising and lowering the harrow sections, said operating mechanism being provided with means for permitting a limited independent upward and downward movement of the harrow sections.

7. A harrow attachment of the class described including spaced supports provided with means for mounting them on a machine, harrow sections pivotally connected with the supports and provided with upwardly extending arms, a transverse member pivotally connected with the arms, one of the parts being provided with means for engaging the other to permit a limited independent movement of the harrow sections, and operating mechanism connected with the transverse member for simultaneously raising and lowering the harrow sections.

8. A harrow attachment of the class described including spaced supports provided with means for mounting them on a machine, harrow sections pivotally connected with the supports and provided with upwardly extending arms having loops, a transverse member pivotally connected with the arms and operating in the loops to permit a limited independent movement of the harrow sections, and operating mechanism connected with the transverse member for simultaneously raising and lowering the harrow sections.

9. A harrow attachment of the class described including spaced supports provided with means for mounting them on a machine, harrow sections pivotally connected with the supports and provided with upwardly extending arms having loops, an arched transverse member having spaced side portions extending through the loops of the arms and pivoted to the latter below the loops, and operating mechanism mounted on one of the supports and connected with the transverse member for raising and lowering the harrow sections.

10. A harrow attachment of the class described including spaced supports provided with means for mounting them on a machine at the opposite sides thereof, hangers adjustably secured to the supports, harrow sections pivotally connected with the hangers and movable upwardly and downwardly, a transverse member composed of longitudinally adjustable sections and connected with the harrow sections, and operating mechanism connected with the transverse member for raising and lowering the harrow sections.

11. A harrow attachment of the class described including spaced supports provided with means for mounting them on a machine at the opposite sides thereof, harrow sections provided with couplings having upright portions adjustably pivoted to the hangers, and a transverse connecting member composed of adjustable sections and pivotally connected to the coupling members.

12. A harrow attachment of the class described including spaced harrow sections, coupling members comprising rearwardly extending arms secured to the harrow sections at opposite sides thereof, and upwardly extending arms, means for pivotally connecting the coupling members with the frame of a machine, a transverse connecting member pivotally connected to the upwardly extending arms, the latter having a limited movement independently of the transverse connecting member, and operating mechanism connected with the transverse connecting member for simultaneously raising and lowering the harrow sections.

13. A harrow attachment of the class described comprising spaced supports having means for mounting them on the frame of a machine, harrow sections, coupling members including rearwardly extending arms secured to the harrow sections, and forwardly extending arms pivotally connected with the hangers, a transverse member connecting the coupling members, and operating mechanism connected with the transverse coupling member.

14. A harrow attachment of the class described comprising spaced supports having means for mounting them on a machine at the opposite sides thereof, harrow sections, coupling members including rearwardly extending arms secured to the harrow sections, forwardly extending arms pivotally connected with the supports, and upwardly projecting arms having loops, an arched connecting member extending through the loops and pivoted to the upwardly extending arms, and operating mechanism connected with the arched member for simultaneously raising and lowering the harrow sections.

In testimony, that we claim the foregoing as our own, we have hereto affixed our signatures in the presence of two witnesses.

CHARLES REISS.
FRANK B. LOUFEK.

Witnesses:
WALLACE E. CALL,
JAMES A. SMALLEY.